United States Patent
Keinath et al.

[11] Patent Number: 5,661,288
[45] Date of Patent: Aug. 26, 1997

[54] OPTOELECTRONIC DEVICE INCLUDING DIGITAL FILTERS COMPENSATING FOR COMPONENT STIPULATED SIGNAL DISTORTION IN A RECIEVED SIGNAL FOR RECOGNIZING BARCODE SYMBOLS

[75] Inventors: Armin Keinath, Dettingen; Jörg Wörner, Filderstadt, both of Germany

[73] Assignee: Leuze electronic GmbH & Co., Owen/Teck, Germany

[21] Appl. No.: 356,232
[22] PCT Filed: Aug. 25, 1994
[86] PCT No.: PCT/EP94/02826
    § 371 Date: Jul. 5, 1995
    § 102(e) Date: Jul. 5, 1995
[87] PCT Pub. No.: WO95/12861
    PCT Pub. Date: May 11, 1995

[30] Foreign Application Priority Data

Nov. 2, 1993 [DE] Germany .................... 43 37 718.1

[51] Int. Cl.⁶ .................................................. G06K 7/00
[52] U.S. Cl. .................................. 235/436; 235/462
[58] Field of Search .......................... 235/462, 436, 235/454; 348/209

[56] References Cited

U.S. PATENT DOCUMENTS

| | | | |
|---|---|---|---|
| 4,219,736 | 8/1980 | Thibodeau | 250/557 |
| 4,323,772 | 4/1982 | Serge | 235/463 |
| 5,354,977 | 10/1994 | Roustaei | 235/472 |
| 5,371,361 | 12/1994 | Arends | 259/235 |

FOREIGN PATENT DOCUMENTS

| | | |
|---|---|---|
| 4346184 | 12/1992 | Japan . |
| 2143636 | 2/1985 | United Kingdom . |

OTHER PUBLICATIONS

L.S. Heim et al."Digital filter for bar-code scanners". IBM Technical Disclosure Bulletin, vol. 17, No. 3, Aug. 1974, pp. 726–727.

U. Tietze et al."Halbleiter–Schaltungstechnik". Springer–Verlag, 5. Auflage 1980, pp. 605–606.

*Primary Examiner*—Donald T. Hajec
*Assistant Examiner*—Karl Frech
*Attorney, Agent, or Firm*—Spencer & Frank

[57] ABSTRACT

An optoelectronic apparatus is provided for identifying marks comprised of defined contrast patterns, particularly barcode symbols. The device includes a transmitting element which emits transmitted light and a receiving element. The transmitted light is guided across the marks, and the received light reflected by the marks has an amplitude modulation imposed by the contrast of the marks, with the received light being converted into a voltage signal that forms the received signal in the receiving element. The voltage signal is converted into a binary signal and filtered by an arrangement of digital filters for compensation component stipulated distortions prior to being fed to a threshold-value unit for evaluation of the contrast pattern.

14 Claims, 3 Drawing Sheets

OPTOELECTRONIC DEVICE INCLUDING DIGITAL FILTERS COMPENSATING FOR COMPONENT STIPULATED SIGNAL DISTORTION IN A RECIEVED SIGNAL FOR RECOGNIZING BARCODE SYMBOLS

BACKGROUND OF THE INVENTION

The invention relates to a method and an apparatus for compensating component-stipulated signal distortions in an optoelectronic apparatus for identifying marks provided with defined contrast patterns, such as bar code symbols. Such an apparatus includes a transmitting element that emits transmitted light, and a receiving element. The transmitted light is guided across the marks and the received light reflected by the marks has an amplitude modulation imposed by the contrast of the marks, wherein the received light is converted in the receiving element into a voltage signal that corresponds to the received signal. The voltage signal is fed to a threshold-value unit for evaluation of the contrast patterns.

An apparatus of this type, which is used to read bar code symbols, is known from JP4-346184A. Such apparatuses can preferably be configured as hand-held reading devices that are guided across the bar code symbols to be read at relatively short distances.

For this purpose, the transmitting element includes, in addition to a transmitter preferably configured as a laser, a scanner that periodically diverts the transmitted light and guides it multiple times across the bar code symbols to be read.

In this type of application, it is sufficient that the transmitted light beam is guided across the bar code at a relatively low scanning rate. Typical scanning rates lie within a range of approximately 30–50 scans/second.

The received light reflected by the bar code symbols has an amplitude modulation that corresponds to the light-dark transitions of the bar code symbols. The signal frequencies are a function of the bar code pattern, on the one hand, and the scanning rate and the reading distance on the other.

The received light is converted into a voltage signal and amplified in the receiving element, which is typically formed by a photosensor, preferably a photodiode, and an amplifier.

The analog received signals are evaluated in the threshold-value unit. The voltage signals are preferably evaluated with a switching threshold, because of which the light zones of the bar code symbols, to which a high intensity of the received signal corresponds, can be distinguished from the dark zones of the bar code symbols, to which a low intensity of the received signal corresponds.

Because the scanning rates at which the bar code symbols are scanned are relatively low, and the reading distances are relatively small and are only subjected to low fluctuations, the bar code symbols can be resolved from the transmitted light beam of the apparatus, i.e., the difference in intensity between the received signals reflected by the light and dark surfaces, respectively, is considerably greater than the signal distortions that take place in the components of the receiving elements. In this respect, reliable detection of the bar code symbols is assured without measures imposed by the manufacturer to compensate component-stipulated signal measurements.

An apparatus for identifying bar code symbols whose receiving element is formed by a line camera comprising a linear arrangement of photodiodes is known from U.S. Pat. No. 4,323,772.

The analog received signal registered by the line camera is digitized by means of a threshold-value unit. A digital filter is disposed downstream of this threshold-value unit. An evaluation of the signals is performed with the digital filter in that a certain state, i.e., a black or white line element of a bar code symbol, is only considered identified when at least two adjacent photodiodes deliver the same received signal. In this way, malfunctions of individual photodiodes can be compensated, or minor errors in the bar code symbols can be suppressed.

However, in many cases, in the use of optoelectronic apparatuses of the type mentioned at the outset in industrial settings, higher requirements are placed on the resolution capability of the apparatus. The distance of the apparatus from the bar code symbols can lie within a range of up to a few meters, and can possibly vary dramatically.

For example, bar code symbols can be applied to packages of different sizes that are transported on a conveyor belt. The optoelectronic apparatus is preferably disposed at a fixed distance above the conveyor belt. Depending on the speed of the conveyor belt, the reading distance and size of the bar code symbols, scanning rates of the apparatus which lie within a range of 1000 scans/second can be necessary. Typical scanning rates lie Within a range of 300–1000 scans/second. At scanning rates of this order of magnitude, the received signal frequencies lie within a range of 0.5 Mhz and higher.

In these types of applications, the signal adulterations caused primarily by the components of the receiving element are of the same order of magnitude as the differences between the received signals reflected by the light and dark surfaces, respectively, of the bar code symbols. A possible result of this is that the bar code symbols can no longer be decoded error-free by the optoelectronic apparatus.

SUMMARY OF THE INVENTION

An object of the invention is to configure an optoelectronic apparatus of the type mentioned at the outset such that reliable detection of marks provided with defined contrast patterns is assured at higher scanning rates.

The above and other objects are accomplished according to the invention by the provision of a method of compensating component-stipulated signal distortions for an optoelectronic apparatus for identifying marks provided with defined contrast patterns, comprising: experimentally determining a transmission function of the signal-distorting components in their entirety; optically scanning the marks and converting, in the signal-distorting components, received light reflected by the marks into an analog, electrical received signal; converting the analog received signal into a digitized received signal; filtering the digitized received signal in an arrangement of digital filters having a transmission function selected such that the transmission functions of the signal-distorting components are linked with the transmission function of the arrangement of digital filters within a predeterminable frequency range to result in an essentially frequency-independent transmission characteristic of a group delay time of the received signal and a Gaussian transmission characteristic of an amplitude of the received signal; and evaluating the filtered, digitized received signal for identifying contrast patterns indicated by the received signal.

According to another aspect of the invention there is provided an optoelectronic apparatus for identifying marks provided with defined contrast patterns, comprising: a transmitting element that emits transmitted light; means for guiding the transmitted light across the marks; a receiving element for receiving light reflected by the marks which has an amplitude modulation imposed by the contrast of the marks and converting the received light into a voltage signal; a threshold-value unit for evaluation of contrast patterns indicated by the received signal; and a compensation device connected between the receiving element and the threshold-value unit and comprising an n-bit analog-digital converter having a word width n larger than one for converting the voltage signal into a binary signal sequence and an arrangement of digital filters disposed upstream of the threshold-value unit.

The basic concept of the invention is to systematically detect the interferences of the received signal that are caused particularly by the receiving element, and to compensate them by means of an arrangement of digital filters. For this purpose, an n-bit analog-digital converter that converts the analog received signal into a digital signal is disposed downstream of the receiving element. It is useful to select the resolution of the analog-digital conversion to be as high as possible, i.e., the word width n of the analog-digital converter should be selected to be as large as possible. Because of this, an information loss is extensively prevented during conversion of the analog signal into a digital signal.

The compensation of the distortions of the receiving signal is effected by a suitable selection of the transmission function of the arrangement of digital filters, to which the digitized received signal is supplied.

Knowledge of the transmission function of the receiving element or, possibly, of further components that distort signals is necessary for determining the transmission function of the digital filter. The transmission function of the receiving element is advisably determined experimentally.

The transmission function of the arrangement of digital filters is selected such that the linking of the transmission functions of the signal-distorting components and the digital filters results in a transmission characteristic for the phase of the received signal that is independent of frequency, and a Gaussian transmission characteristic for the amplitude of the received signal. Thus, phase errors and amplitude errors are compensated equally by the apparatus of the invention.

A significant advantage of the invention is that the compensation for distortion takes place via digital filters which can be dimensioned very precisely in their transmission characteristic over a large frequency range. Because of this, signal distortions in a frequency range of up to a few MHz can be eliminated. This means that error-free detection of the bar code symbols is assured, even at scanning rates in the kHz range.

The signal distortions caused by the signal-distorting components can be eliminated completely and systematically by the apparatus according to the invention. In particular, distortions of the received signals themselves can be eliminated when they are of the same order of magnitude as the useful signals.

The dimensioning of the digital filter is effected by way of a suitable selection of filter coefficients. These filter coefficients can be set using a software program. Thus, component tolerances can be changed in a time-saving manner without a hardware expenditure. The quality of the apparatus can therefore be increased cost-effectively and monitored.

In a useful embodiment of the invention, a recursive IIR filter is used to eliminate the phase errors. A non-recursive FIR filter is advantageously used to eliminate the amplitude distortions of the received signal.

These filters have a defined number of freely-selectable coefficients. The desired transmission function can be modelled very precisely through the selection of these coefficients.

BRIEF DESCRIPTION OF THE DRAWINGS

The invention is described below by way of the drawings. Shown are in.

a) representation of a bar code symbol b) received signal at the input of the threshold-value unit c) differentiated received signal d) binary received signal sequence at the output of the threshold-value unit.

DETAILED DESCRIPTION OF THE PREFERRED EMBODIMENT

Figure 1:
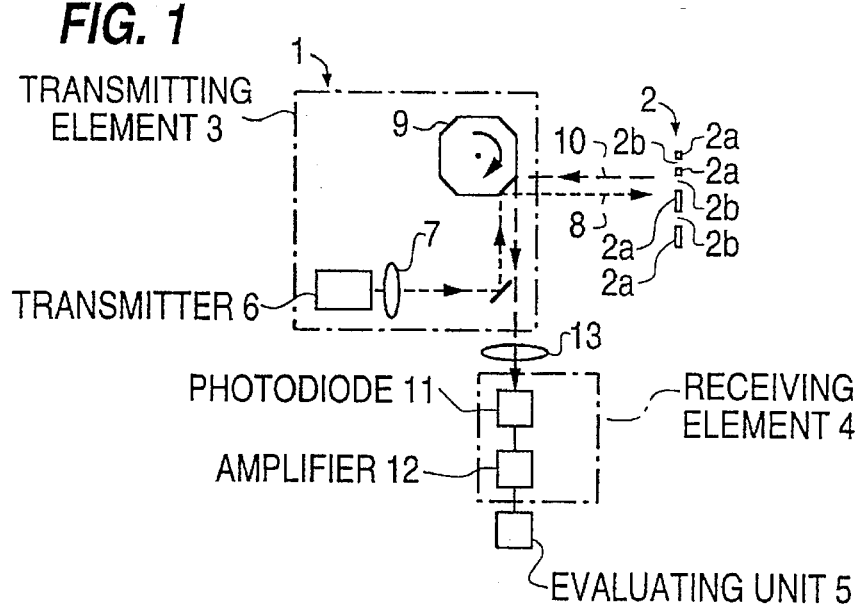
FIG. 1: a fundamental construction of the optoelectronic apparatus.

Shown in FIG. 1 is the fundamental structure of an optoelectronic apparatus 1 according to the invention for identifying marks provided with defined contrast patterns. In principle, the marks can have arbitrary sequences and shapes of contiguous light-dark surfaces, preferably black-white surfaces. The invention is explained below for the case that the marks are formed by bar code symbols 2. The bar code symbols 2 essentially comprise a sequence of black and white line elements 2a, b, respectively, of defined length and width.

The optoelectronic apparatus 1 essentially comprises a transmitting element 3, a receiving element 4 and an evaluating unit 5. The transmitting element 3 comprises a transmitter 6, preferably a laser diode, and transmitting optics 7 which is disposed downstream of the transmitter 6 and focuses the transmitted light 8. The focussed transmitted light 8 is deflected by a mirror 20 onto a diverting unit 9 which, in the present example, is formed by a rotating polygonal mirror wheel, and guided to the bar code symbol 2 to be detected. The axis of rotation of the polygonal mirror wheel is perpendicular to the equatorial plane of the polygonal mirror wheel illustrated in FIG. 1.

The received light 10 reflected by the bar code symbol 2 is guided to the receiving element 4 by way of the polygonal mirror wheel. The receiving element 4 comprises a photodiode 11, in which the received light 10 is converted into an electrical received signal, and an amplifier 12 disposed downstream of the receiving element. To improve the detection sensitivity, receiving optics 13 is disposed upstream of the receiving element 4.

The received signal present at the output of the receiving element 4 is supplied to the evaluating unit 5.

Figure 2:
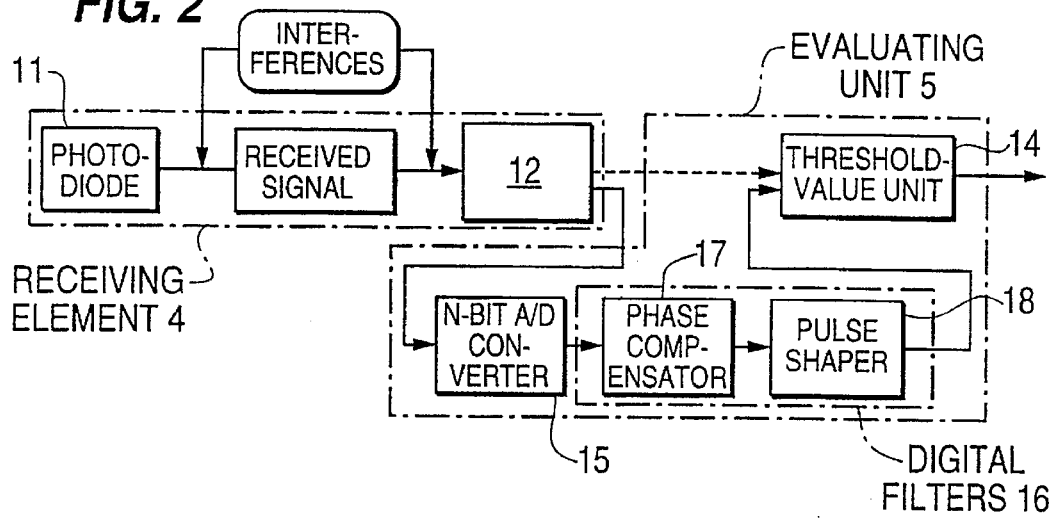
FIG. 2: a block diagram of the evaluating unit of the optoelectronic apparatus according to the invention.

In optoelectronic apparatuses according to the prior art mentioned at the outset, the evaluating unit 5 solely comprises a threshold-value unit 14 (FIG. 2). This type of apparatus is illustrated in FIG. 2 with a dashed arrow line between amplifier 12 and threshold-value unit 14. In this case the received signal is supplied as an analog signal to the evaluating unit 5.

The evaluating unit 5 of the apparatus 1 of the invention has an n-bit analog-digital (A/D) converter 15 and an arrangement 16 of digital filters disposed downstream thereof, the filters being disposed upstream of the threshold-value unit 14. This evaluating unit 5 is characterized by solid arrow lines in FIG. 2.

Figure 3:
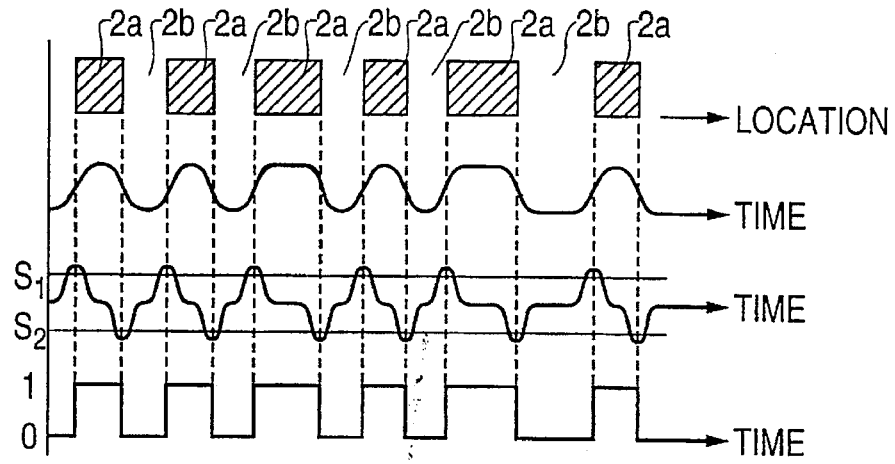
FIG. 3: pulse diagram of signal evaluation in the threshold-value unit including.

The principle of the evaluation of the received signals can be seen from FIG. 3. A bar code symbol 2 comprising a series of black and white line elements 2a, b, respectively, is illustrated in FIG. 3a. If the edge errors of the bar code symbol 2 are imperceptibly small, i.e., the contrasts between black and white surfaces are very sharp, and if the beam diameter of the transmitted light 8 on the bar code symbol 2 is significantly smaller than the smallest width of a line element 2a, b, the transmitted light 8 is modulated in amplitude by the reflection from the bar code symbol 2, as shown in FIG. 3b.

If no distortion or adulteration of the received signal takes place in the receiving element 4, the curve shape shown in FIG. 3b corresponds to the received signal present at the output of the receiving element 3.

The determination of the width of the individual line elements 2a, b of the bar code symbol 2 in the evaluating unit 5 is advisably effected according to the turning point method.

In a first step, the received signal is differentiated (FIG. 3c). Subsequently, the extremes of the differentiated received signal that correspond to the turning points of the received signals are determined. These turning points in turn define the transitions from a black to a white line element or vice versa.

For determination of the turning points of the received signals, the differentiated received signal is converted, preferably with two switching thresholds $S_1$ and $S_2$ (FIG. 3c), into a binary signal (FIG. 3d). The duration of the '0' and '1' states of the binary signal sequence is a measure for the width of the line elements 2a, b of the bar code symbol 2. The duration of the '0' and '1' states can be detected simply by means of a clock-controlled counter.

Because of signal distortions in the receiving element 4 of the optoelectronic apparatus 1, the turning points of the received signal sequence can be displaced so significantly that a reconstruction of the line pattern of the bar code symbol 2 from the received signal is no longer possible.

The arrangement 16 of digital filters disposed upstream of the threshold-value unit 14 and an analog-digital converter 15 disposed upstream of this arrangement 16 are provided in the evaluating unit 5 in order to eliminate these signal distortions.

The n-bit analog-digital converter 15 has a word width in a range of n=8–12. In the present embodiment, an 8-bit analog-digital converter 15 is used. Because of this, the analog received signal can be converted into a digitized received signal with a high resolution.

The arrangement 16 of digital filters disposed downstream of the analog-digital converter 15 comprises two filters connected in series. The first filter is a phase compensator 17 that is used to eliminate the phase distortions of the received signal, while the second digital filter represents a pulse shaper 18 that is used to eliminate the amplitude distortions of the received signal.

The phase compensator 17 is formed by a recursive IIR filter. The fundamental construction of a two-stage IIR filter is illustrated in FIG. 4). The output value of the IIR filter $y_n$ at a time n is a function of the input value $x_m$ at different times m=n, n–1, n–2, ..., n–M; the time n–M is an earlier time with respect to the time n by M discrete time stages. In addition, the output value $y_n$ is a function of the output value $y_m$ at different, earlier times m=n–1, n–2, ..., n–M:

$$y_n = \sum_{m=0}^{M} a_m x_{n-m} - \sum_{m=1}^{M} b_m y_{n-m}$$

The weighting of the influence values $y_m$ and $x_m$ is effected with coefficients $a_m$ or $b_m$, which are adjustable. The number M of coefficients determines the degree of the IIR filter. In the present embodiment, a series connection of three IIR second-degree filters is used.

Figure 4A:
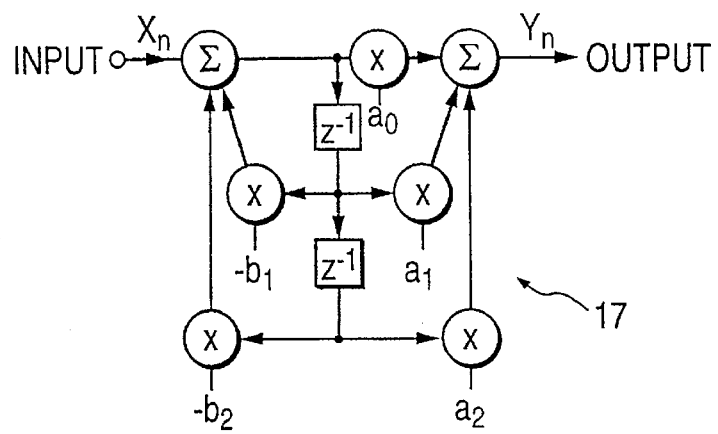
FIG. 4a: a block diagram of an IIR filter.

The variable z shown in FIG. 4a is the variable in the frequency range that is a conjugate for time variables n. The value $z^{-1}$ represents the length of the delay between two linkage points, e.g. $x_n$ and $x_{n-1}$. The symbols x and Σ, respectively, characterize a multiplicative or additive linkage.

Figure 4B:
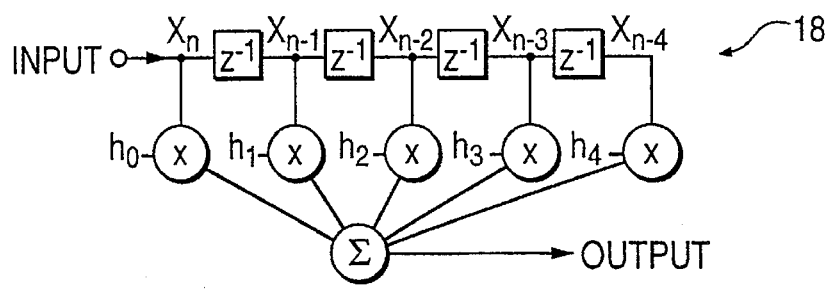
FIG. 4b: a block diagram of an FIR filter.

The pulse shaper 18 is formed by a non-recursive FIR filter. The fundamental construction of an FIR filter is illustrated in FIG. 4b. The output value $y_n$ of the FIR filter is a function of the input value $x_m$ (m=n, n–1, n–2, ..., n–M) at different times.

$$Y_n = \sum_{m=0}^{M} h_m x_{n-m}$$

The weighting of the input values $x_m$ is effected with adjustable coefficients $h_m$. The number M of coefficients $h_m$ determines the degree of the filter. In the present embodiment, an 18 degree FIR filter is used.

The digitized and filtered received signal is fed to the threshold-value unit 14 and converted into a binary signal sequence there.

Figure 5:
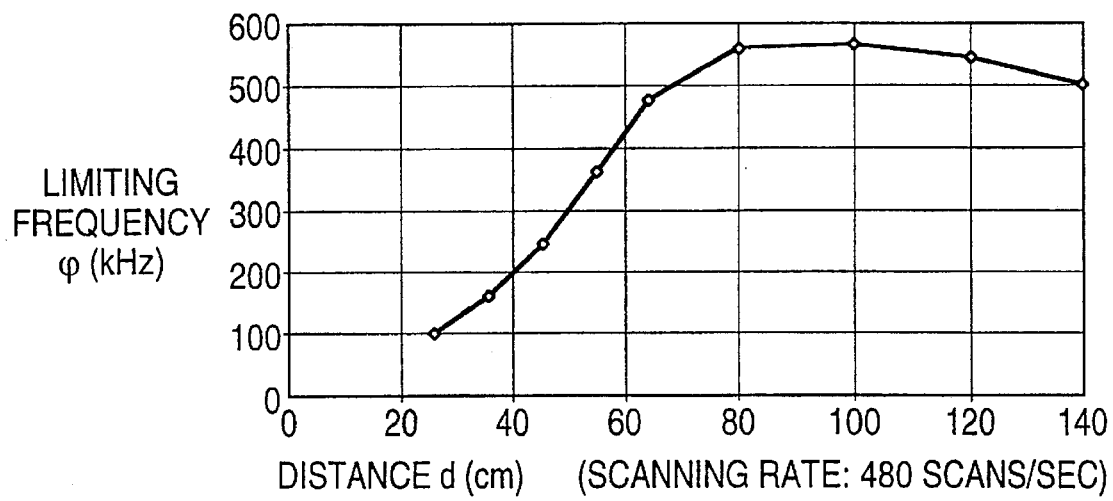
FIG. 5: a graph showing limiting frequency of the received signal as a function of the reading distance.

FIG. 5 illustrates the upper limiting frequency of the received signals of an optoelectronic apparatus 1 for a predetermined scanning rate of 480 scans/second as a function of the reading distance d. The limiting frequency lies within a range of a few hundred kHz, even above 500 kHz for reading distances d greater than 70 cm. At these types of high received signal frequencies, the interferences in the receiving element 4 typically cause distortions of the received signals of the same order of magnitude as the useful signals.

To eliminate these interferences, the frequency dependency of the transmission function of the receiving element 4 is determined in a first method step, i.e., the frequency response of the amplitude and the group delay time of the received signal is determined in the received signal. The group delay time is defined as the differential $d\psi/df$, that is, the differentiation of the phase of the received signal according to the frequency. The response behavior of the receiving element 4 can be usefully effected by the feeding in of a predetermined signal and measurement of the phase and amplitude of the output signal. The step response of the receiving element is advantageously measured and converted into the pulse response.

Figure 6:
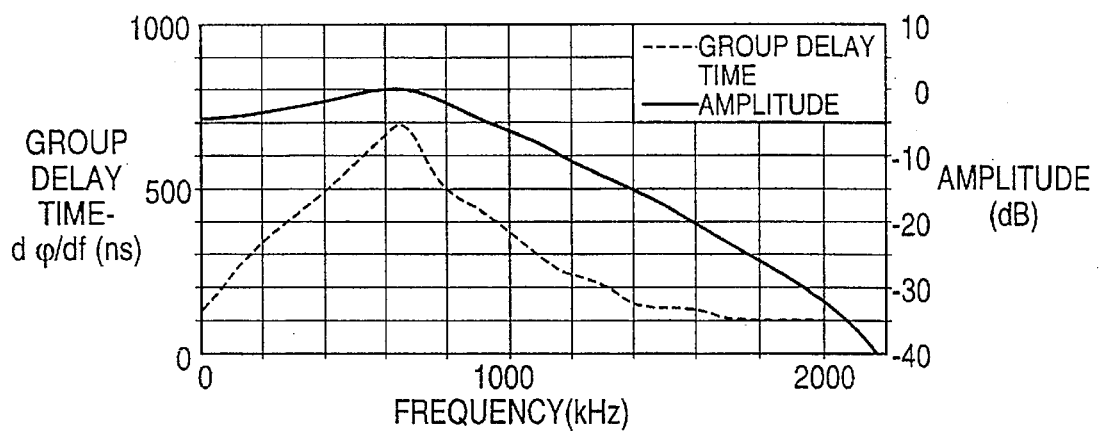
FIG. 6: a graph showing frequency dependency of the group delay time and the amplitude of the received signal in the receiving element.

The behavior shown in FIG. 6 results for the present embodiment. The characteristics of the receiving element 4 deviate greatly from the ideal behavior, namely a frequency-independent amplitude and a frequency-independent group delay time.

The basic idea of the method according to the invention is to dispose an arrangement 16 of digital filters downstream of the receiving element 4, the transmission function of the filters being such that signal distortions are eliminated by the receiving element 4, i.e., that the transmission function of the entire system comprising the receiving element 4 and the arrangement 16 of digital filters is such that the frequency response of the group delay time is independent of frequency, at least in the frequency range of the received signals (FIG. 5), and the frequency response of the amplitude has a Gaussian characteristic in this frequency range.

Figure 7:
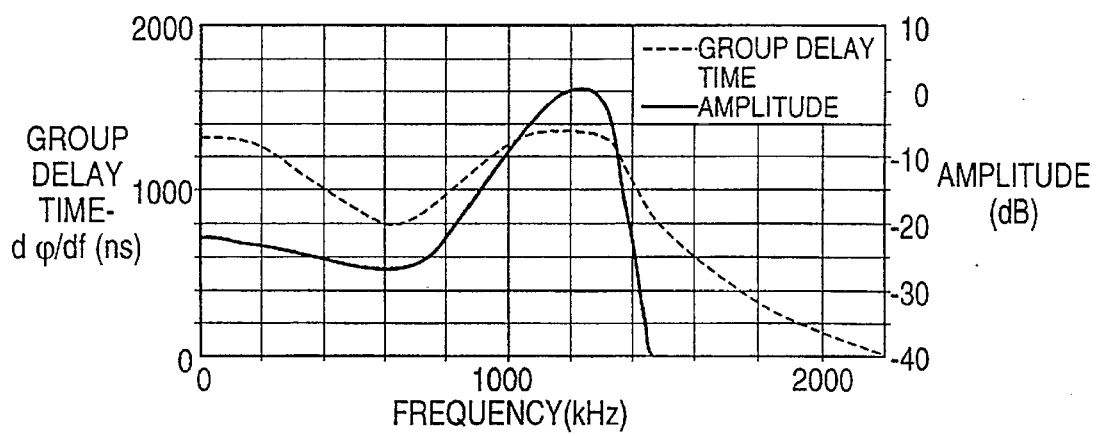
FIG. 7: a graph showing frequency dependency of the group delay time and the amplitude of the received signal in the arrangement of digital filters.

This is achieved on the one hand in that the frequency response of the group delay time of the received signal in the phase compensator 17 is essentially formed in the receiving element 4 by the difference between a constant and the frequency response of the group delay time of the received signal (FIG. 7). The coefficients of the digital filter forming the pulse shaper 18, on the other hand, are selected such that they do not influence the group delay time of the received signal.

On the other hand, the coefficients of the pulse shaper 18 are selected such that the product of the transmission functions of the receiving element 4 and the pulse shaper 18 has a Gaussian characteristic; the maximum of the Gaussian transmission function lies at the frequency f=0, and at higher frequencies it drops off to a frequency $f_1$, at which the transmission function assumes the value 0. In a useful manner, the coefficients of the digital filter forming the phase compensator 17 are selected such that the phase compensator 17 alone influences the group delay time, but not the amplitude of the received signal.

Because of this, it is accomplished that solely the phase characteristic is optimized by means of the phase compensator 17, and solely the amplitude of the received signal is optimized by means of the pulse shaper 18.

Because the amplitude in the receiving element 4 is very low at high frequencies, or assumes the value zero (FIG. 6), the amplitude in the pulse shaper 18 would have to become very large at high frequencies or assume the value infinity in order to assure an ideal transmission behavior.

Since this cannot be realized, a deviation from the ideal behavior is obtained above a limiting frequency $f_0$ for the series connection of receiving element 4 and pulse shaper 18, namely an amplitude that decreases with increasing frequency. The frequency response of the group delay time has the same behavior.

Provided that the limiting frequency $f_0$, at which the transmission function of the entire system of receiving element 4, phase compensator 17 and pulse shaper 18 uses the frequency dependency, lies above the limiting frequency of the received signals, an essentially distortion-free transmission behavior is obtained. The coefficients of the IIR filter and the FIR filter are selected so that this condition is met.

Figure 8:
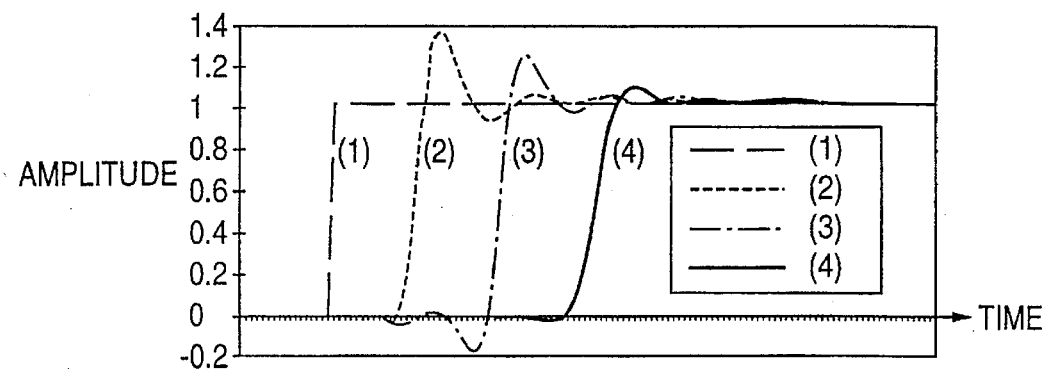
FIG. 8: a graph showing received signal as a function of time, (1) at the input of the receiving element, (2) at the output of the receiving element, (3) at the output of the phase compensator, (4) at the output of the pulse shaper.

The influence of the digital filters on the signal course of the received signal is illustrated in FIG. 8. For the sake of an overview, the different curve shapes are shown staggered in time in FIG. 8.

The ideal, non-distorted received signal (1) comprises a step function. This corresponds to the transition from a black to a white line element 2a, b of a bar code symbol 2.

As it passes through the receiving element 4, the received signal is distorted and has the curve shape indicated by (2). The phase errors of the received signal (3) are extensively eliminated at the output of the phase compensator 17, so that the overshoots are configured symmetrical to the time axis when the received signal increases from the signal value of 0 to the signal value of 1. The received signal is smoothed by the pulse shaper 18, so virtually no more overshoots are present in the signal curve (4) at the output of the pulse shaper 19. As a result, through the use of the digital filters 17, 18, the ideal signal course (1) is nearly recovered from the received signal (2) distorted in the receiving element.

The arrangement 16 of digital filters according to the invention assures a compensation of component-stipulated signal distortions. Only component parameters, particularly the characteristic of the transmission function of the receiving element 4, are considered in the selection of the coefficients of the filters 17, 18. Consequently, this compensation is not a function of the parameters of the transmitted light beam 8, and particularly of the reading distance d, the beam diameter and the beam shape.

We claim:

1. A method of compensating component-stipulated signal distortions for an optoelectronic apparatus for identifying marks provided with defined contrast patterns, comprising:

determining a component specific transmission function of the signal-distorting components in their entirety;

optically scanning the marks and converting, in the signal-distorting components, received light reflected by the marks into an analog, electrical received signal;

converting the analog received signal into a digitized received signal;

filtering the digitized received signal in an arrangement of digital filters having a transmission function selected such that the component specific transmission function of the signal-distorting components is linked with the transmission function of the arrangement of digital filters within a predeterminable frequency range to result in an essentially frequency-independent transmission characteristic of a group delay time of the received signal and a Gaussian transmission characteristic of an amplitude of the received signal; and evaluating the filtered, digitized received signal for identifying the contrast patterns.

2. The method according to claim 1, wherein the predeterminable frequency range encompasses the frequencies of the received signal.

3. An optoelectronic apparatus for identifying marks provided with defined contrast patterns, comprising:

a transmitting element that emits transmitted light;

means for guiding the transmitted light across the marks;

a receiving element for receiving light reflected by the marks which has an amplitude modulation imposed by the contrast of the marks and converting the received light into a voltage signal;

a threshold-value unit for evaluation of contrast patterns indicated by the received signal; and a compensation device connected between the receiving element and the threshold-value unit and comprising an n-bit analog-digital converter having a word width n larger than one for converting the voltage signal into a binary signal sequence and an arrangement of digital filters disposed upstream of the threshold-value unit for compensating component-stipulated distortions of the received signal.

4. The apparatus according to claim 3, wherein the arrangement of digital filters includes two digital filters connected in series.

5. The apparatus according to claim 3, wherein a first one of the digital filters comprises a phase compensator which changes the group delay time of the received signal in a frequency-selective manner.

6. The apparatus according to claim 5, wherein the group delay time of the received signal in the phase compensator has a frequency response that essentially corresponds to a difference between a constant and a frequency response of the group delay time of the received signals in the receiving element.

7. The apparatus according to claim 5, wherein the phase compensator comprises an IIR filter having adjustable coefficients.

8. The apparatus according to claim 5, wherein a second one of the filters comprises a pulse shaper which changes the amplitude of the received signal in a frequency-selective manner.

9. The apparatus according to claim 8, wherein the frequency response of the amplitude of the received signal in the pulse shaper and the frequency response of the amplitude of the received signal in the receiving element have a product that essentially corresponds to a Gaussian function below a limiting frequency.

10. The apparatus according to claim 9, wherein the limiting frequency lies within a range of 1–2 MHz.

11. The apparatus according to claim 8, wherein the pulse shaper comprises an FIR filter having adjustable coefficients.

12. The apparatus according to claim 11, wherein the FIR filter comprises an 18 degree filter.

13. The apparatus according to claim 3, wherein the word width of the n-bit analog-digital converter is within a range of $8 \leq n \leq 12$.

14. The apparatus according to claim 3, wherein the transmitting element includes a transmitter comprising a laser and a diverting unit for guiding the transmitted light across the marks, and the receiving element comprises a photodiode and an amplifier connected to the photodiode for amplifying the received signal.

* * * * *